G. X. LEFFLER.
WHEEL.
APPLICATION FILED MAR. 23, 1911.
1,011,351.
Patented Dec. 12, 1911.
2 SHEETS—SHEET 1.
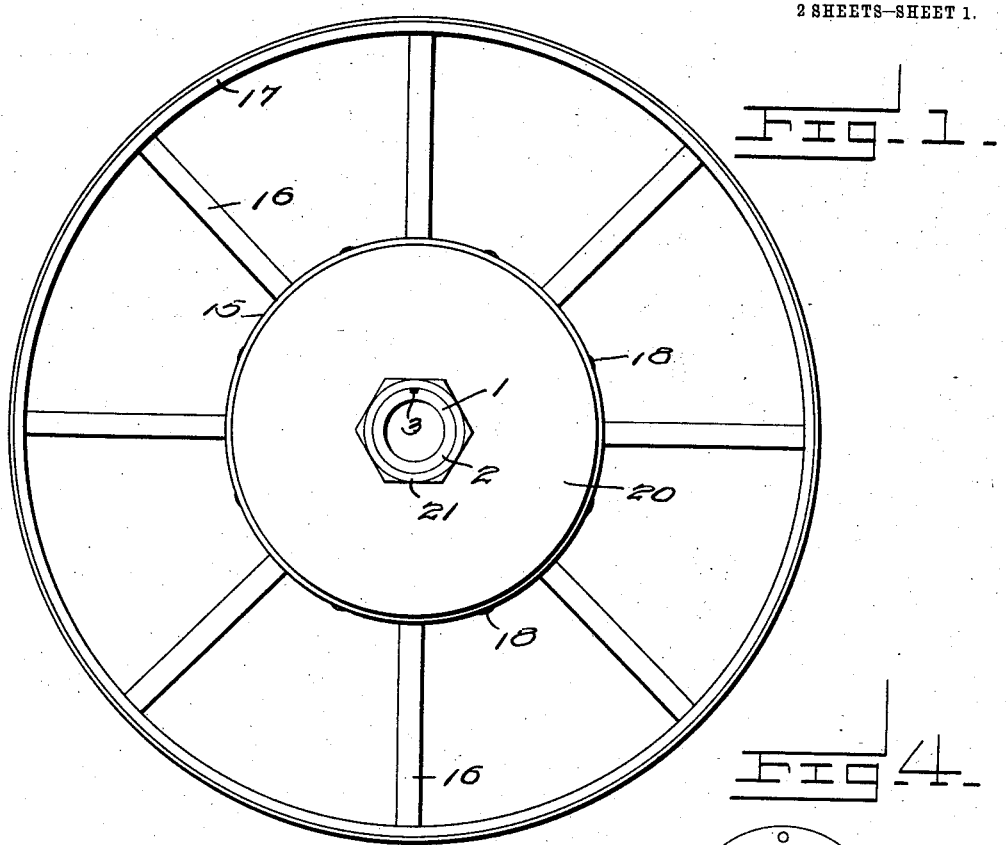
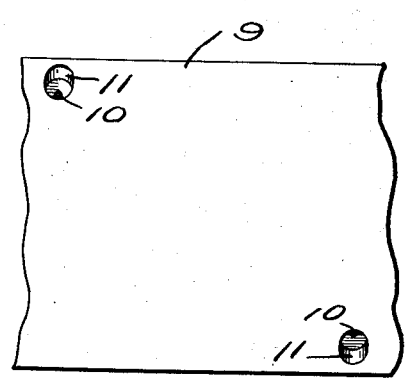
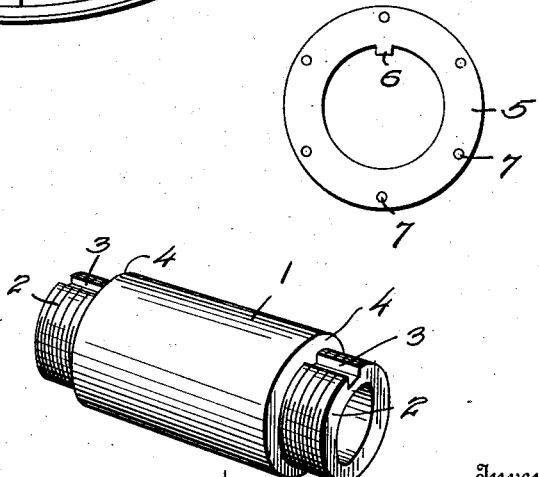
Witnesses
Inventor
G. X. Leffler,
By Harry Ellis Chandlee
Attorney

G. X. LEFFLER.
WHEEL.
APPLICATION FILED MAR. 23, 1911.

1,011,351.

Patented Dec. 12, 1911.

2 SHEETS—SHEET 2.

Witnesses

Inventor
G. X. Leffler,
By Harry Ellis Chandlee,
Attorney

UNITED STATES PATENT OFFICE.

GEORGE X. LEFFLER, OF TALALA, OKLAHOMA.

WHEEL.

1,011,351.  Specification of Letters Patent.  Patented Dec. 12, 1911.

Application filed March 23, 1911. Serial No. 616,297.

*To all whom it may concern:*

Be it known that I, GEORGE X. LEFFLER, a citizen of the United States, residing at Talala, in the county of Rogers and State of Oklahoma, have invented certain new and useful Improvements in Wheels, of which the following is a specification.

My invention relates to improvements in wheels, and has for its leading object the provision of an improved wheel of the resilient type adapted for use upon carriages, automobiles or other vehicles.

A further object of my invention is the provision of an improved form of spring or resilient central member for a vehicle wheel which will be of strong and durable construction and will insure to said wheel the resiliency and shock absorbing features of a pneumatic tire while entirely obviating the disagreeable features of puncturing and blowing out which are present so frequently when pneumatic tires are employed upon vehicle wheels.

Other objects and advantages of my improved wheel will be readily apparent from the following description taken in connection with the drawings, and it will be understood that I may make any changes or modifications in the specific structure shown and described within the scope of the claims without departing from or exceeding the spirit of the invention.

Figure 2:
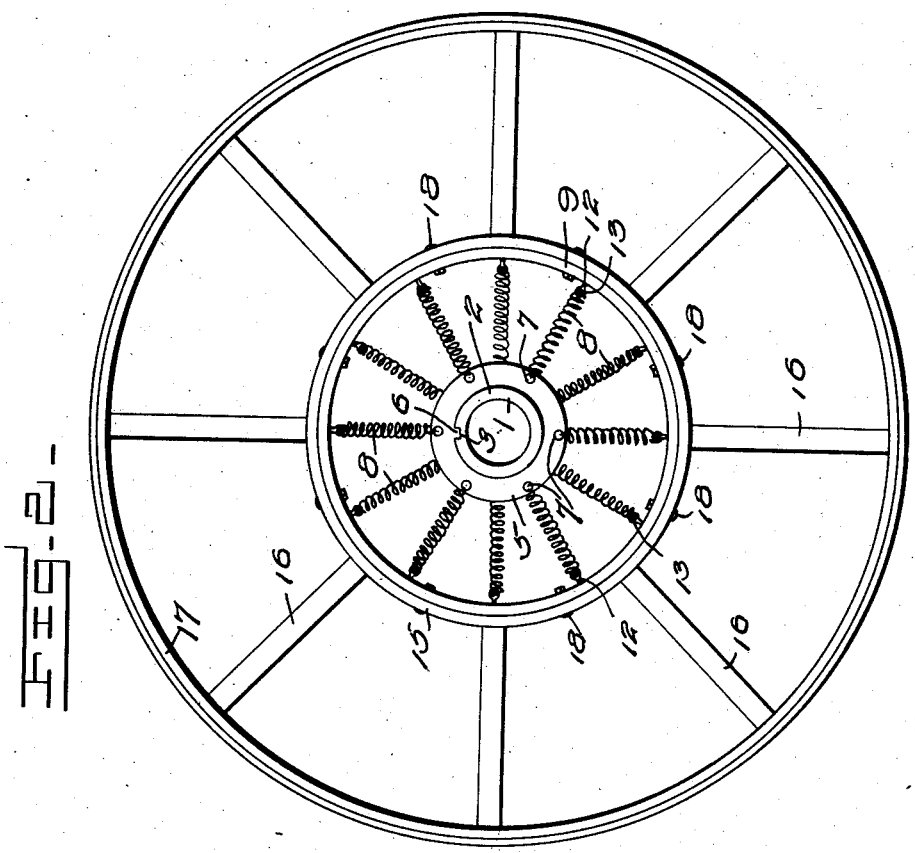
Figure 3:
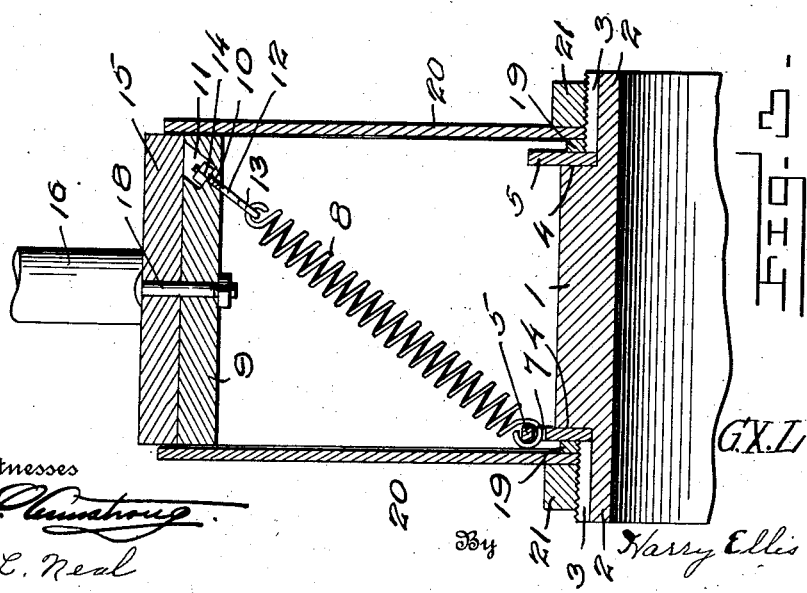

Figure 1 represents a side elevation of my improved wheel. Fig. 2 represents a similar view with the protecting end plate removed. Fig. 3 represents a sectional view of my improved wheel. Fig. 4 represents a detailed view of one of the end disks. Fig. 5 represents a plan view of the removable rim or ring, and Fig. 6 represents a perspective view of the hub of my wheel.

In the drawings, the numeral 1 designates the hub of my improved spring wheel, said hub having the reduced exteriorly threaded ends 2 having the grooves 3 formed therein, said ends 2 terminating inwardly at the shoulders 4 of the main portion of the hub.

Slidably engaged upon the reduced portion 2 at each end of the hub is a disk 5 having an integral inwardly projecting tongue 6 for engagement in the groove 3 of the hub to prevent rotation of the disk with respect to the hub, said disk having the row of apertures 7 formed therein. Secured in said apertures 7 is one end of the helical spring members 8 there being a spring 8 for each of the apertures in the two disks 7 the apertures being in staggered relation with respect to each other and the springs crossing each other, as clearly shown in the drawings. To engage the outer ends of the springs, I provide the ring 9 having the inclined sockets 10 formed therein with enlarged upper ends 11, while engaged in the sockets 10 are the shanks 12 having the eyes 13 on their lower ends which are secured to the ends of the springs and having engaged on their threaded upper ends the adjusting nuts 14 which fit into the enlargements 11 of the sockets, the rotation of said adjusting nuts on the threaded portion of the shanks 12 shifting the shanks to adjust the tension of the springs 8, while by loosening the nuts the springs can be quickly disengaged from the ring 9.

It will be evident from the preceding description that the construction of my hub and ring 9 resiliently supported thereby will be readily understood, and it will be seen that upon pressure to force any portion of the ring 9 toward the hub certain of the springs 8 will be stretched, thus yieldingly resisting the movement of the ring and returning it to its normal position when the temporary stress thereagainst is ended.

Fitting tightly around the ring 9 is the hub sleeve 15 to which are secured the spokes 16 of my wheel having secured to their outer ends the vehicle wheel rim 17 of customary construction. To secure the hub sleeve to the ring 9 I pass through said sleeve and ring a plurality of fastening bolts 18 which lock said parts together the ground engaging portion or rim of the wheel being thus secured to the ring 9 and the jolting of the rim 17 passing over inequalities or uneven places in the road being absorbed by the springs 8.

To retain the disks 5 in position upon the hub 1, I engage on the threaded reduced ends 2 the clamping nuts 19 which serve to hold the disks against the shoulders 4 of the hub, while mounted on the hub and bearing against the outer faces of the nuts 19 are the circular dust protecting plates 20 which project outward beyond the ring 9 and thus prevent dust and dirt from entering the space between the hub and ring and clogging the springs. To secure said plates 20 in position I engage on the outer ends of the hub the locking nuts 21.

From the foregoing description taken in connection with the drawings, the construction of my improved resilient wheel will be readily understood, and it will be seen that I have provided a simple and efficient spring wheel in which by loosening the bolts 18 and removing one of the nuts 21 and plates 20 the entire spring device may be removed or detached from the wheel and any worn or broken parts can be readily replaced. It will further be observed that I have provided a simple, efficient and desirable spring wheel in which the various spring retaining members are removably secured upon the hub of the wheel and may easily be removed therefrom and replaced when worn, which wheel will serve to absorb all shocks and jolts in a more satisfactory manner than a pneumatic tired wheel while avoiding and eliminating the delays and vexations occasioned by puncturing of said pneumatic tire, I thus having provided a wheel which will satisfactorily fulfil all the objects of my invention.

I claim:

The combination with a hub having reduced threaded ends with longitudinally extending grooves formed therein, of a disk engaged on each end of the hub, said disk having an inwardly projecting tongue fitting in the groove of the hub, a plurality of helical springs secured to the disk and extending inwardly at an acute angle thereto, a ring, connections between said ring and the outer ends of the springs, a wheel having a hub sleeve fitting over said ring and secured thereto, clamping nuts for securing the disks in position on the hub, protecting plates fitting on the hub and bearing against the clamp nuts, said plates being of size to project outward even with the hub sleeve of the wheel, and means for securing said plates in position on the hub.

In testimony whereof I affix my signature, in the presence of two witnesses.

GEORGE X. LEFFLER.

Witnesses:
E. M. DIKEMAN,
CHAS. ROBINSON.